United States Patent [19]

Akeel et al.

[11] Patent Number: 4,807,486

[45] Date of Patent: Feb. 28, 1989

[54] THREE-AXES WRIST MECHANISM

[75] Inventors: Hadi A. Akeel, Rochester Hills; Donald S. Bartlett, Troy; William H. Poynter, Jr., Mount Clemens, all of Mich.

[73] Assignee: GMF Robotics Corporation, Auburn Hills, Mich.

[21] Appl. No.: 118,450

[22] Filed: Nov. 9, 1987

[51] Int. Cl.$^4$ .................... B25J 17/02; G05G 11/00
[52] U.S. Cl. .................... 74/479; 74/665 C; 901/26; 901/29
[58] Field of Search ............ 74/665 C, 479; 901/26, 901/29

[56] References Cited

U.S. PATENT DOCUMENTS

| | | | |
|---|---|---|---|
| 3,784,031 | 1/1974 | Niitu et al. | 214/1 CM |
| 4,030,617 | 6/1977 | Richter | 214/1 CM |
| 4,047,448 | 9/1977 | Pardo et al. | 74/417 |
| 4,499,790 | 2/1985 | Helms | 74/665 C |
| 4,574,655 | 3/1986 | Kimura et al. | 901/26 X |
| 4,576,545 | 3/1986 | Maeda | 901/26 X |
| 4,594,918 | 6/1986 | Kimura et al. | 901/26 X |
| 4,603,865 | 8/1986 | Bien | 74/606 R X |
| 4,648,817 | 3/1987 | Mariani | 74/606 A X |
| 4,683,772 | 8/1987 | Colimitra | 901/29 X |
| 4,688,984 | 8/1987 | Nakashima et al. | 901/29 X |
| 4,708,580 | 11/1987 | Akeel | 901/29 X |

FOREIGN PATENT DOCUMENTS

| | | | |
|---|---|---|---|
| 240438 | 10/1987 | European Pat. Off. | 901/26 |
| 3532265 | 3/1987 | Fed. Rep. of Germany | 901/29 |

Primary Examiner—Allan D. Herrmann
Attorney, Agent, or Firm—Brooks & Kushman

[57] ABSTRACT

A three-axis wrist mechanism has first, second and third independent rotational axes with two points of mutual intersection which are offset from each other, the first axis being inclined at a fixed angle relative to at least one input drive axis of an input drive mechanism. The drive axis extends along the robot arm to which a first housing of the wrist mechanism is fixedly attached. A second housing is supported on the first housing for rotation about the first axis and a third housing is supported on the second housing for rotation about the second axis. A tool-support member having a tool-mounting surface is supported on the third housing for rotation about the third axis. Gear trains of the mechanism provide the independent rotation of the second and third housing structures and the tool support member to permit selective positioning of the tool-mounting surface in a work envelope. Each of the gear trains includes a gear member supported for rotation about the first axis and in driving engagement with its respective pinion gear which, in turn, is mounted at the end of its respective drive shaft of the drive mechanism.

16 Claims, 3 Drawing Sheets

4,807,486

THREE-AXES WRIST MECHANISM

TECHNICAL FIELD

This invention relates to mechanical wrist mechanisms and, more particularly, to wrist mechanisms which have three independent rotational axes.

BACKGROUND ART

Many types of transmission elements are in use in robot design. The purpose of the transmission is to transmit mechanical power from a source to a load. Choice of transmission elements depends on power requirements, the nature of the desired motion, and the placement of the power source with respect to the joint. The primary considerations in transmission design are stiffness, efficiency, and cost.

Gears are the most common transmission elements in robots today. Factors to consider in gear design are material choice, choice of material surface treatment, and manufacturing precision. Considerations in designing geared transmissions are gear ratio, type of gear, gear shaft support, control of center distances, and lubrication.

Spur gears are most commonly used for parallel axis transmission or prismatic motions in rack and pinion configuration. Spur gears have the advantage of producing minimum axial forces, which minimize the need for controlling play in the gear mount.

A number of U.S. patents disclose geared transmission elements in wrist mechanisms. For example, the Niitu et al U.S. Pat. No. 3,784,031 discloses an early example of geared transmission elements for use in a wrist mechanism.

The Richter U.S. Pat. No. 4,030,617 discloses a wrist mechanism having concentric drive shafts and spur and bevel gear trains. However, the design is relatively expensive due to the large number of components. The Kimura et al U.S. Pat. Nos. 4,574,655 and 4,594,918 disclose the use of bevel gears and speed reduction devices in their respective three-axes wrist mechanisms.

Helical gears are also used in robot transmissions. They have several specific advantages. Because gear reductions are often quite large in robot transmissions, lack of adequate gear tooth contact ratio can be a problem. For given gear ratios and gear sizes, helical gears have higher contact ratios and, as a result, produce smoother output. They also tend to be quieter. One disadvantage of helical gears is that they produce axial gear loads that must be constrained to maintain drive stiffness.

The limiting factor in gear transmission stiffness is the stiffness of the gear teeth; each tooth acts as an elastic cantilever during the time that it is loaded. To maximize stiffness, the largest possible gear diameters should be chosen.

A common revolute joint transmission element in robot design is the harmonic drive. These drives feature in-line parallel shafts and very high transmission ratios in compact packages. With selective assembly procedures, near zero backlash harmonic drives can be produced. Static friction in these drives, and manufacturing tolerances often result in cyclic friction torque variation called cogging. Also, such drives are difficult to backdrive when the robot is taught by leading it through its motions manually.

Power is often transmitted in robots through torsion shafts or weight-saving torque tubes. Transmitting power at low torque and high angular velocities minimizes shaft diameter, wall thickness, and weight.

Several robot manufacturers use toothed positive drive belts as transmission elements. They are used primarily when low-cost power transmission is required over large distances, or as a simple interface between a drive motor and the first stage of gear reduction. Transmission ratios are limited because there is generally a minimum pulley size based on belt fatigue life. Drive stiffness in a belt transmission is a function of the belt material and belt tensioning system. While light in weight, backlash and vibration make the use of such belts problematic. The Beyer U.S. Pat. No. 4,608,884 discloses gear belts which extend between pulleys which, in turn, are attached to the shafts of a pair of reduction gears in a robot head.

Another important consideration in evaluating transmission system performance is efficiency. Most robot transmission elements have good efficiencies when they are transmitting at or near their rated power levels. However, transmissions with high static friction such as harmonic drives with a low backlash option or belt drives with heavily preloaded bearings and high belt pretension are not very efficient at power transmission levels that are a small percentage of their rated limits.

Other important considerations in choosing transmission elements are system geometry, compactness, and simplicity. Planetary spur gears and harmonic drives are among the most compact forms of transmission elements.

The Helms U.S. Pat. No. 4,499,790 discloses a swivel head for industrial robots having two degrees of freedom. The head has two intersecting axes and uses planetary gears.

One of the most pertinent prior art patents is the Pardo et al. U.S. Pat. No. 4,047,448 which discloses a robot hand or wrist having a stationary control casing, three perpendicular shafts and corresponding axes and members. The members are supported for driving rotation about one of the axes by servo motors in the control casing.

In choosing transmission elements, one must also consider the time required for adjustment and set-up procedures. Proper backlash control of gears requires adjustments of distance between gear centers.

Smoothness of the power transmission is another design consideration, especially where low-speed motion is required such as in arc welding. Bands and linkage provide a smooth drive. Ball screws also provide smooth drives if they are clean and in good condition. Gears are not as smooth as screws and belts, but, in general, they are smoother than chains and harmonic drives. Proper setup is critical for smoothness of operation of gears.

In general, when large reduction ratios are required, transmission elements of choice will be harmonic drives, gears, or ball screws. For a low transmission ratio, rack and pinion drives, single-stage gearing, belts, cables, or chains are used.

DISCLOSURE OF THE INVENTION

An object of the present invention is to provide an improved three-axes mechanical wrist mechanism, including three independent rotational axes to provide flexibility and positioning of a wide variety of tool members in a work envelope, which is relatively easy to backdrive during teaching, which is relatively inexpensive to make and assemble and which can be driven from a relatively high-speed source.

Another object of the present invention is to provide an improved mechanical wrist mechanism wherein no two axes of the wrist can be co-linearly aligned with each other and no two axes can be in parallel alignment with each other in commonly used areas of the robot (especially for painting robots) and wherein a first axis of the wrist is parallel to the two previous robot axes, allowing a closed-form solution of the inverse kinematic equations, thereby simplifying programming of the robot.

Yet still another object of the present invention is to provide an improved mechanical wrist mechanism having a compact design and wherein substantially all speed reduction is accomplished in the wrist mechanism with only a few small gears.

In carrying out the above objects and other objects of the invention, a mechanical wrist mechanism constructed in accordance with the present invention includes a relatively stationary first housing and first, second and third independent rotational axes. The first and second axes have a point of mutual intersection and are movable relative to each other. The first axis is fixed relative to the first housing and the third axis is movable relative to both the first and second axes. A tool support member is rotatable on the third axis and has a tool-mounting surface. Second and third housings are rotatably supported on the first and second axes, respectively. First, second and third gear train means provide independent rotation of the second and third housings and the tool support member, respectively, about their respective axes. Each of the gear train means has a member supported for rotation about the first axis. Input drive means is supported on the first housing for rotation about at least one input drive axis inclined at an angle fixed relative to the first axis. The input drive means is in driving engagement with each of the members for selectively rotating the members to selectively establish the position of the tool-mounting surface within a substantially spherical envelope.

Preferably, the wrist mechanism is adapted to be mounted at the end of the outer arm of a robot so that the first axis lies in a plane parallel to the floor on which the robot is supported and is oriented to be perpendicular to the centerline of the outer arm. The second axis intersects and is perpendicular to the first axis. The second axis also rotates about the first axis in a vertical plane. The second axis is offset from the centerline by a fixed distance. The third axis intersects, is perpendicular to the second axis and is a roll axis for a tool or other device mounted at the end of the wrist mechanism. There is an offset between the intersection of the first and second axes and the second and third wrist axes. The first housing is attached to the outer arm and contains the first axis. The second housing is rotatably attached to the first housing, rotates about the first axis and contains the second axis. The third housing is rotatably attached to the second housing, rotates about the second axis, and contains the third axis. The tool support member is rotatably attached to the third housing and rotates about the third axis.

Preferably, the input drive means includes first, second and third input drive assemblies supported on the first housing for rotation about first, second and third separate input drive axes, respectively. Each of the input drive axes is inclined at the fixed angle. The first, second and third input drive assemblies are in driving engagement with the first, second and third gear train members, for selectively rotating the members.

Also, preferably, each of the input drive assemblies includes a pinion gear in driving engagement with its respective bevel gear of the first, second and third gear train means.

Yet, still preferably, first and second sets of bearings rotatably support the second housing structure on the first housing structure and the third housing structure on the second housing structure, respectively. First, second and third sets of seals, each of which includes a labyrinthian seal and a lip seal, isolate the interior of the wrist mechanism from the ambient environment of the robot. The seals prevent grease from leaving the robot and contaminants from entering the robot.

A mechanical wrist mechanism as constructed above provides numerous advantages. First of all, only inexpensive gear such as bevel gears are used, eliminating the use of expensive harmonic or planetary drive systems. Since substantially all the gear reduction is done at the wrist mechanism, power may be transferred from the drive motors to the wrist mechanism at low torque and high velocities, allowing the use of small, light-weight torque tubes. The wrist mechanism also eliminates the cost and weight of any other reduction mechanisms located away from the wrist mechanism. The entire drive train has relatively few gears, reducing friction power losses and allowing for easier backdriving. The wrist mechanism is compact, and easy to assemble. In the preferred form, the first axis of the wrist is parallel to the previous two robot axes and programming is simplified, since this configuration allows for a closed form solution to the inverse kinematic equations. Also, none of the wrist axes are in alignment with the centerline of the robot arm which keeps the areas of kinematic singularity away from the most frequently used space of the robot.

Other advantages of the present invention will be readily appreciated as the same becomes better understood by reference to the following detailed description when considered in connection with the accompanying drawings.

BEST MODE FOR CARRYING OUT THE INVENTION

Figure 1:
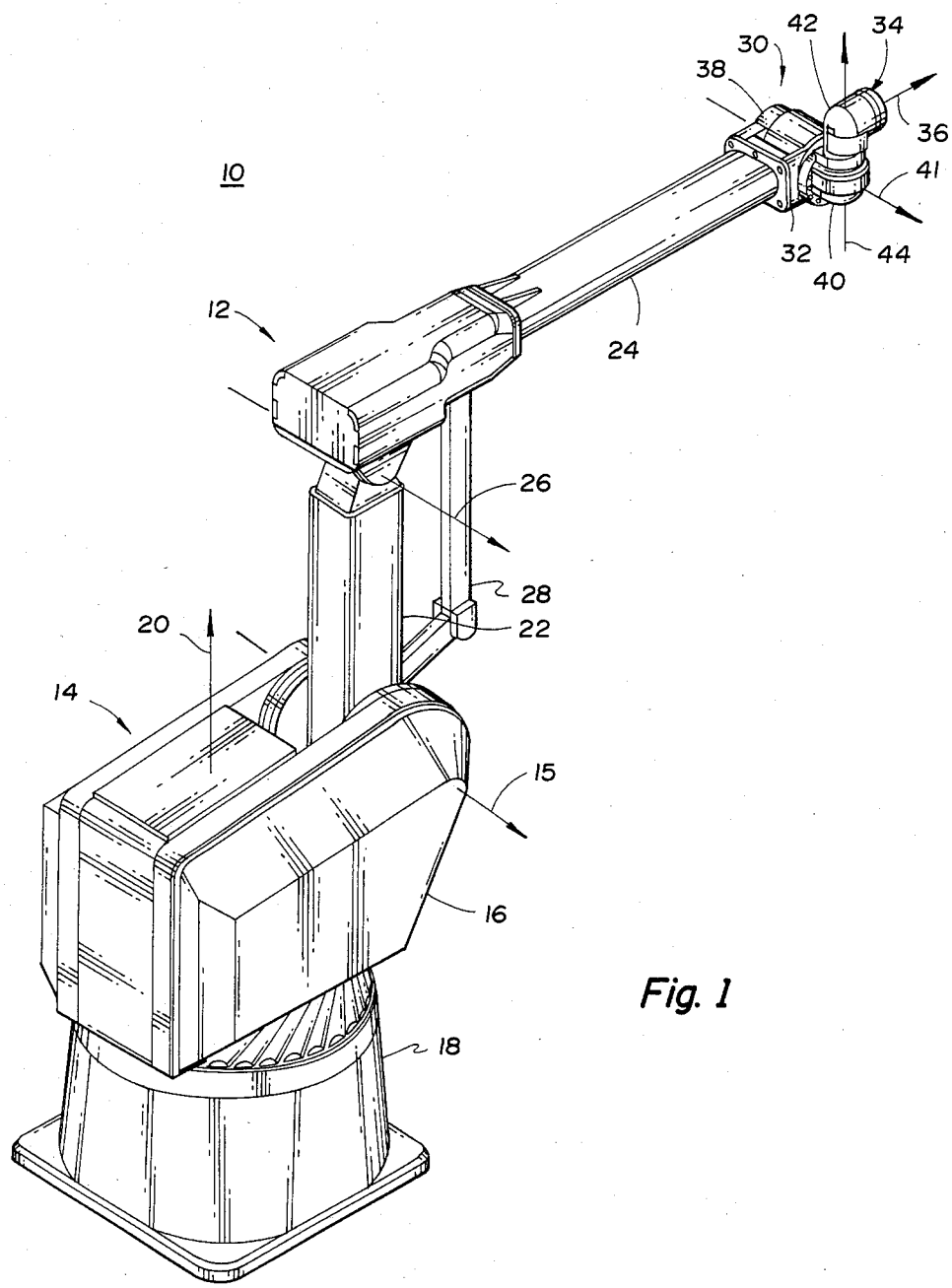
FIG. 1 is a perspective view of a robot with a wrist mechanism constructed in accordance with the present invention attached at the free end of an outer arm thereof.

Referring now to the drawings, there is illustrated in FIG. 1 an articulated arm robot utilizing the invention as disclosed and claimed herein. The robot, collectively indicated at 10, includes an arm assembly, generally indicated at 12, which has a pivotal connection which pivotally supports the arm assembly 12 on a base, generally indicated at 14. The base 14 includes an upper base member 16 which is rotatably supported on a stationary lower base member 18 for rotation about a pivotal axis 20. The arm assembly 12 pivots about a pivotal axis 15 on the base 14.

The arm assembly 12 includes an inner arm 22 and an outer arm 24 which is pivotally supported on the inner arm 22 for movement about a pivotal axis 26. Linkage 28 drives the outer arm about the pivotal axis 26.

Figure 3:
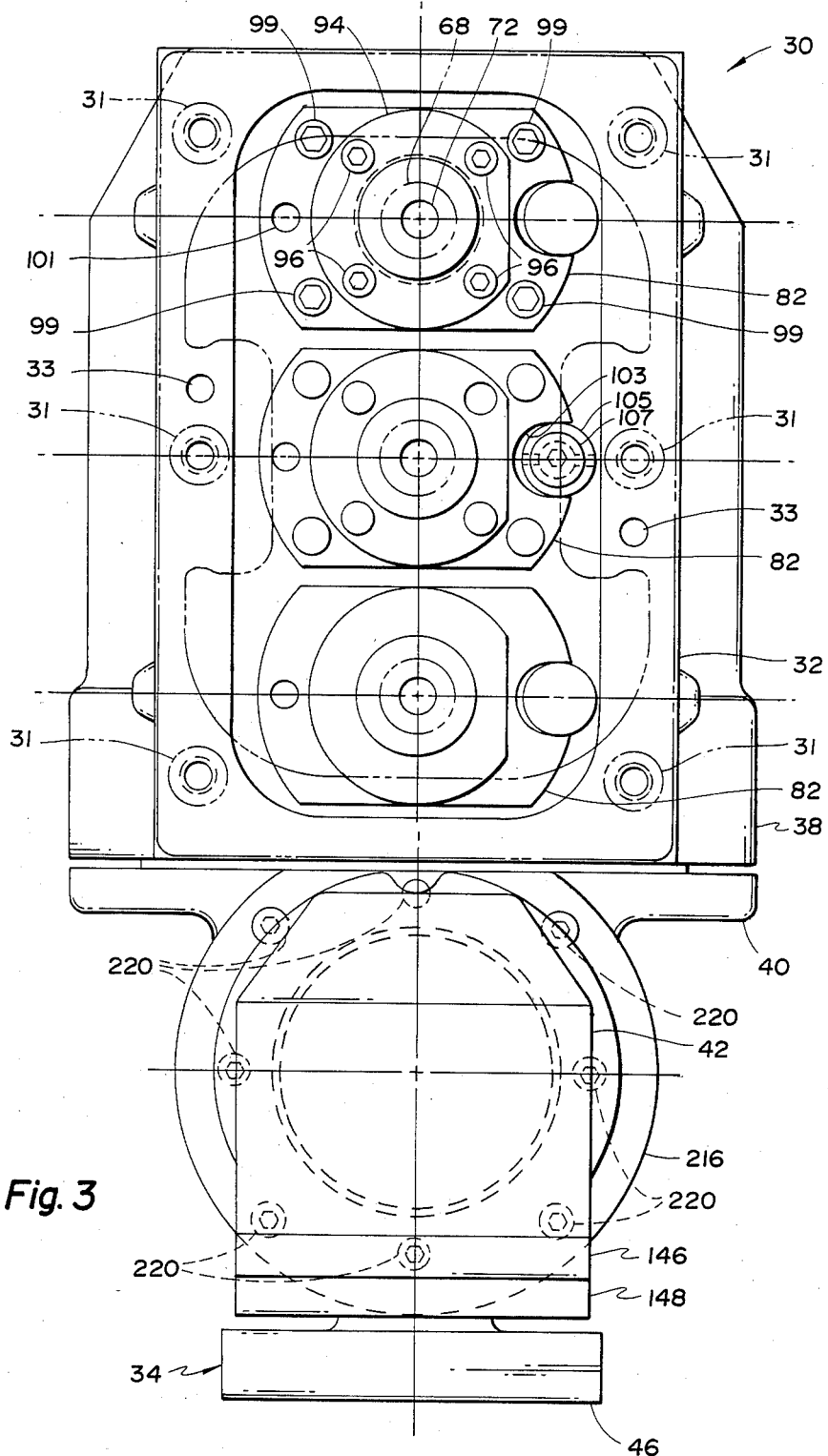
FIG. 3 is an end view of the wrist mechanism of FIG. 2 looking from the robot's outer arm.

A three-axes wrist mechanism, generally indicated at 30, is mounted on the free end of the outer arm 24 by a mounting plate 32. The wrist mechanism 30 is fixedly mounted to the plate 32 by screws 31 and pins 33 as shown in FIG. 3. The wrist mechanism 30 is adapted to support a tool (not shown) on a tool support member, generally indicated at 34, which is rotatable on an output axis 36 of the wrist mechanism 30. The work tool mounted on the support member 34 may comprise a welder or paint sprayer or other device which is useful in the assembly or finishing of a product.

While shown as connected to the outer arm 24 of the robot 10 in FIG. 1, it is to be understood, however, that the wrist mechanism 30 may also be connected to a boom or support arm of many other types of robots in order to move an end effector or work tool within a work envelope.

Figure 2:
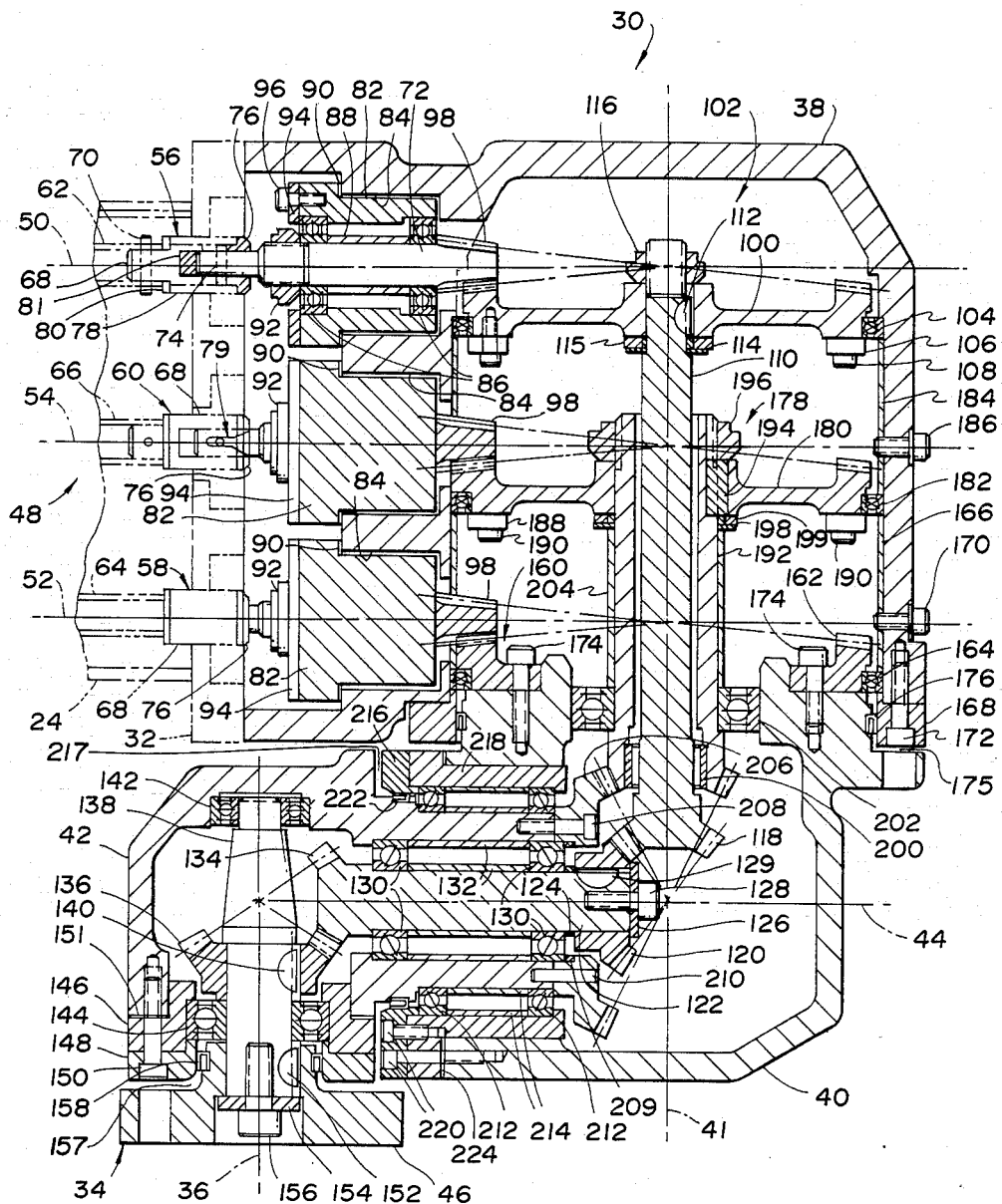
FIG. 2 is a sectional view of the wrist mechanism of FIG. 1.

As shown in FIGS. 1 and 2, the wrist mechanism 30 includes a first housing structure 38 and a second housing structure 40 rotatably supported on the first housing structure 38 for rotation about a first axis 41. In turn, the second housing structure 40 rotatably supports a third housing structure 42 for rotation about a second or intermediate axis 44. The third housing structure 42 supports the tool support member 34 for rotation about the output or third axis 36. The member 34 has a tool-mounting surface or face 46 on which a wide variety of tools can be readily mounted.

An input drive means or mechanism, generally indicated at 48, of the wrist mechanism 30, is supported on the first housing 38 for rotation about first, second and third input drive axes 52, 54 and 50, respectively. The input drive mechanism 48 selectively establishes the position of the tool-mounting surface 46 within a substantially spherical envelope. The input drive mechanism 48 includes first, second and third input drive assemblies 58, 60 and 56, respectively, supported within the first housing structure 38. The assemblies 58, 60 and 56 are in driving engagement with high velocity input or torque tubes 64, 66 and 62, respectively, received and retained within the outer arm 24 for rotation about their input drive axes 52, 54 and 50, respectively.

The input drive assemblies 58, 60 and 56 are substantially identical to one another. Each assembly includes a coupler 68, one end of which is connected to the free end of its respective torque tube 64, 66 and 62 to rotate therewith by a pin 70.

The opposite end of each coupler 68 has a slot 79 which engages a second pin 74. The second pin 74 is pressed into a hole in the end of a pinion shaft 72. The slot 79 transmits torsional load, allows for axial tolerance stack-up of the various parts, and simplifies the assembly of the input drive assemblies 58, 60 and 56 onto their respective pinion shafts or pinions 72. The input drive assemblies 58, 60 and 56 are prevented from axially making contact with the pinion 72 by a rubber bumper 81. Each drive assembly, such as the input drive assembly 56, has a cylindrical tube 78 on the outside of its coupler 68 to prevent the pin 74 from "walking out" of the hole in the pinion 72. The tube 78 is retained by a washer 80.

Each of the input drive assemblies 58, 60 and 56 also includes a pinion block 82 located within mounting apertures 84 formed in the first housing 38. Each of the pinion blocks 82 rotatably supports its respective pinion 72 by ball bearings 86 which are spaced from each other by a spacer 88. Each of the pinion blocks 82 is spaced from the first housing by spacers 90. A lock nut 92 is threadedly mounted on the pinion 72 to secure the bearings 86 about the pinion 72. A retainer 94 secured to each pinion block 84 by a plurality of circumferentially spaced screws 96 secures the bearings 86 within their respective pinion block 82.

On the opposite end of each of the pinion 72 there is a pinion gear 98 to rotate therewith about its respective drive axis. The three pinion gears 98 are in driving engagement with three bevel gears 162, 180 and 100. As shown in FIG. 3, means for adjusting the backlash of these gearsets is provided by using an eccentric bushing 105. The bushing 105 has a slight eccentric between its inner and outer diameter and fits snugly inside a slot 103 in the pinion block 82. When the eccentric bushing 105 is rotated around the shaft of a shoulder screw 107, it causes the pinion block 82 to rotate about a pin 101, which raises or lowers the pinion gear 98 and changes the amount of backlash between it and its bevel gear 162, 180 and 100. After the backlash has been properly adjusted, the eccentric is locked down by the shoulder screw 107 and the pinion block 82 is locked down to the first wrist housing 38 by screws 99.

As shown in FIG. 2, the wrist mechanism 30 includes a first gear train means or mechanism, generally indicated at 160. In general, the first gear train mechanism 160 provides independent rotation of the second housing 40 about the first axis 41. The first gear train mechanism 160 includes the first bevel gear or member 162 in driving connection with the lowermost pinion gear 98 of the first input drive assembly 58. The bevel gear 162 is rotatably supported on the first housing 38 by a ball bearing 164 which is, in turn, supported between a first cylindrical spacer 166 and a retainer 168. The spacer 166 is prevented from rotating by a screw 170. The retainer 168 is fixedly mounted to the first housing 38 by a plurality of circumferentially spaced screws 172 (only one of which is shown).

The bevel gear 162 is fixedly secured to the second housing 40 by a plurality of circumferentially spaced screws 174. The second housing 40 and the retainer 168 cooperate to define a labyrinthian seal 175 which, together with a lip seal 176 prevent contamination of the inside of the wrist 30 when the robot 10 is used in a hostile (i.e. paint spray) environment.

The wrist mechanism 30 also includes a second gear train means or mechanism, generally indicated at 178. In general, the second gear train mechanism 178 provides independent rotation of the third housing 42 about the second or intermediate axis 44. The second gear train mechanism 178 includes the second bevel gear or member 180 in driving engagement with the middle pinion gear 98 and rotatably supported on and within the first housing 38 by a ball bearing 182. In turn, the ball bearing 182 is supported between the first spacer 166 and a second cylindrical spacer 184. The second cylindrical spacer 184 is prevented from rotating within the first housing 38 by a screw 186. The bevel gear 180 is fixed to the bearing 182 by a retainer 188 which is mounted to the bevel gear 180 by a plurality of circumferentially spaced screws 190.

A hollow pinion gear 192 is fixedly mounted to and rotates with the bevel gear 180 by a key 194 and a lock nut 196. The other side of the pinion gear 192 is supported inside the housing 40 by a bearing 202. A spacer 204, a washer 198 and shims 199 fixedly attach the bearing 202 onto the pinion 192 and the pinion gear 192 onto the bevel gear 180. The thickness of the shims 199 is adjusted so that the apex point of the bevel pinion 192 is positioned on the second axis 44. The teeth of the pinion gear 192 are in driving engagement with a bevel gear 206 which is fixedly mounted to the third housing 42 by screws 208 and dowels 210. A spacer 209 is adjusted to clamp the bearing 130 and spacers 132 between the gear 206 and the third housing 42.

The third housing 42 is rotatably supported on the second housing 40 by ball bearings 212 which are separated by spacers 214. A retainer 216 retains the bearings 212 inside a cartridge 218 fastened to the second housing 40 by screws 220. A spacer 224 spaces the cartridge 218 from the second housing 40 to adjust the backlash between the gear 206 and the pinion 192.

Another sealing means or mechanism, including a second lip seal 222, is provided to prevent contamination of the bearing 212 when the wrist mechanism 30 is used in a hostile environment. The retainer 216 and the third housing 42 cooperate to define a second labyrinthian seal 217 which cooperates with the lip seal 222 to provide this sealing function.

The wrist also contains a third gear train means or mechanism, generally indicated at 102. In general, the third gear train mechanism 102 provides independent rotation of the tool support member 34 upon actuation of the input drive assembly 56. The bevel gear 100 is rotatably supported within the first housing structure 38 by a ball bearing 104 which is retained by a retainer 106 which is fixedly mounted on the lower surface of the bevel gear 100 by a plurality of circumferentially spaced screws 108.

The solid pinion gear 110 is fixedly attached to the bevel gear 100 using a key 112 and a lock nut 116 and rotates with the gear 100 about the first axis 41. A washer 114 and shims 115 are used to adjust the pinion gear 110 so the apex of the gear 110 lies on the second axis 44. The other end of the pinion gear 110 is rotatably supported in the hollow pinion gear 192 by a needle bearing 200.

The opposite end of the pinion gear 110 includes teeth 118 in driving engagement with a gear 120 mounted on a second pinion gear 122 of the third gear train mechanism 102. The gear 120 is fixedly attached to the pinion gear 122 using a screw 128, a washer 126 and a key 129. The pinion gear 122 is rotatably supported within the third housing structure 42 by bearings 130 separated by concentric spacers 132. An annular spacer 124 spaces the gear from the bearing 130 and is used to adjust the backlash between the pinion 110 and the gear 120.

At the opposite end of the pinion gear 122 there are formed teeth 134 which are in driving engagement with a gear 136, fixedly mounted on a shaft 138 of the third gear train mechanism 102 by a key 140. One end of the shaft 138 is rotatably supported in the third housing 42 by ball bearing 142 and an intermediate portion of the shaft 138 is rotatably supported by ball bearing 144 located between the shaft 138 and a cartridge 146 mounted on the third housing 42 by a retainer 148 and a plurality of circumferentially spaces screws 150 (only one of which is shown in FIG. 2). Spacers 151 are provided between the third housing 42 and the cartridge 146 for adjusting the backlash between the gear 136 and the pinion 122.

At the opposite end of the shaft 138 there is fixedly mounted the tool support member 34 to rotate therewith by means of a key 152, a washer 154 and a screw 156. The tool support member 34 and the retainer 148 cooperate to define a labyrinthian seal 157 which, together with a lip seal 158, prevent contamination of the bearings 144 when the wrist mechanism 30 is used in a hostile (i.e. paint spray) environment.

The wrist mechanism 30 is particularly useful for robots which are controlled to perform various manufacturing and production processes. The wrist mechanism 30 could also be used with other devices such as a clamp device which can be operated to position a component during assembly.

The rotary motion of the torque tubes 64, 66 and 62 can be accomplished by any available well-known rotary drive devices such as electric motors, pneumatic motors or hydraulic motors. If desired, the input of the torque tubes 64, 66 and 62 can be manipulated manually. It is apparent that the rotation of these input tubes 64, 66 and 62 can be controlled in a desired pattern by using a computer having an appropriate program to control their rotation. These devices are only cited by way of example and it will be apparent from the foregoing description that the wrist mechanism 30 can be useful in many instances where a universal positioning device is necessary.

The above-noted construction of the wrist mechanism supplies numerous advantages. For example, the wrist mechanism 30 is relatively easy to backdrive during teaching, is relatively inexpensive to make and assemble and is compact. All speed reduction is done in the wrist mechanism 30 from a relatively high speed source with only a few small gears.

The invention has been described in an illustrative manner and, it is to be understood, that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A mechanical wrist mechanism for positioning a work tool comprising:
   a relatively stationary first housing;
   first, second and third independent rotational axes, the first and second axes having a point of mutual intersection and being movable relative to each other, the first axis being fixed relative to said first housing, and the third axis intersecting the second axis and being movable relative to both the first and second axes;
   a tool support member rotatable on the third axis and having a tool mounting surface;
   second and third housings rotatably supported on the first and second axes, respectively;
   first, second and third gear train mains for providing independent rotation of said second and third housings and said support member, respectively, about their respective axes, each of said gear train means having a member supported for rotation about the first axis wherein said third gear train means includes a first gear means (110) coupled to said third member (100) to rotate therewith about the first axis for providing rotation of the support member and wherein said second gear train means includes a second gear means (192) rotatably supported on the first gear means (110) and wherein said second member (180) is coupled to said second gear means to rotate therewith about the first axis for providing rotation of the third housing and wherein the second and third housings are permitted to rotate completely about the first axis; and input drive means supported on said first housing for rotation about at least one input drive axis inclined at an angle fixed relative to the first axis, the input drive means being in driving engagement with each of said members for selectively rotating the members to selectively establish the position of said tool mounting surface within a substantially spherical envelope.

2. A three-axis wrist mechanism for manipulating a tool member comprising:

a relatively stationary first housing;

a tool support member supported on an output axis and having a tool support surface;

second and third housings, the second housing being supported on said first housing for rotation about a first axis; and the third housing supported on said second housing for rotation about an intermediate axis, said third housing rotatably supporting said tool support member;

first, second and third gear train means, each having a member supported for rotation about the first axis wherein said third gear train means includes a first gear means (110) coupled to said third member (100) to rotate therewith about the first axis for providing rotation of the support member and wherein said second gear train means includes a second gear means (192) rotatably supported on the first gear means (11) and wherein said second member (180) is coupled to said second gear means to rotate therewith about the first axis for providing rotation of the third housing and wherein the second and third housings are permitted to rotate completely about the first axis; and input drive means supported on said first housing for rotation about at least one input drive axis inclined at an angle fixed relative to the first axis, the input drive means being in driving engagement with each of said members for selectively rotating the members to selectively position the tool support surface.

3. A mechanical wrist mechanism for positioning a work tool comprising:

a relatively stationary first housing;

first, second and third independent rotational axes, the first and second axes having a point of mutual intersection and being movable relative to each other, the first axis being fixed relative to said first housing, and the third axis being movable relative to both the first and second axes;

a tool support member rotatable on the third axis and having a tool mounting surface;

second and third housings rotatably supported on the first and second axes, respectively;

first, second and third gear train means, said third gear train means providing independent rotation of said support member and said first and second gear train means providing independent rotation of said second and third housings respectively, about their respective axes, the first, second and third gear train means having first, second and third members, respectively, supported for rotation about the first axis wherein said third gear train means includes a first gear means (110) coupled to said third member (100) to rotate therewith about the first axis for providing rotation of the support member and wherein said second gear train means includes a second gear means (192) rotatably supported on the first gear means (110) and wherein said second member (180) is coupled to said second gear means to rotate therewith about the first axis for providing rotation of the third housing and wherein the second and third housing are permitted to rotate completely about the first axis; and input drive means including first, second and third input drive assemblies supported on said first housing for rotation about first, second and third separate input drive axes, respectively, each of said input drive axes being inclined at an angle fixed relative to the first axis, the first, second and third input drive assemblies being in driving engagement with the first, second and third members, respectively, for selectively rotating the members to selectively establish the position of said tool mounting surface within a substantially spherical envelope.

4. A three-axis wrist mechanism for manipulating a tool member comprising:

a relatively stationary first housing;

a tool support member supported on an output axis and having a tool support surface;

a second housing supported on said first housing for rotation about a first axis;

a third housing supported on said second housing for rotation about an intermediate axis, said third housing rotatably supporting said tool support member;

first, second and third gear train means including first, second and third members, respectively, supported for rotation about the first axis wherein said third gear train means includes a first gear means (110) coupled to said third member (100) to rotate therewith about the first axis for providing rotation of the support member and wherein said second gear train means includes a second gear means (192) rotatably supported on the first gear means (110) and wherein said second member (180) is coupled to said second gear means to rotate therewith about the first axis for providing rotation of the third housing and wherein the second and third housings are permitted to rotate completely about the first axis; and input drive means including first, second and third input drive assemblies supported on said first housing for rotation about first, second and third separate input drive axes, respectively, each of said input drive axes being inclined at an angle fixed relative to the first axis, the first, second and third input drive assemblies being in driving engagement with the first, second and third members, respectively, for selectively rotating the members to selectively establish the position of said tool mounting surface within a substantially spherical envelope.

5. The mechanism as claimed in claim 4 wherein each of said input drive assemblies includes a drive gear and wherein each of said members is a bevel gear in driving engagement with its respective drive gear.

6. The mechanism as claimed in claim 5 wherein said drive gears are substantially identical and said bevel gears having substantially identical teeth.

7. The mechanism as claimed in claim 5 wherein each of said input drive assemblies includes a drive shaft supported for rotation about its respective input drive axis and wherein said drive gears are mounted at the ends of their respective drive shafts.

8. The mechanism as claimed in claim 1 or 2 or 3 or 4 or 5 or 6 further comprising bearing means for rotatably supporting the second housing on the first housing and sealing means for sealing the bearing means from the ambient of the envelope.

9. The mechanism as claimed in claim 8 wherein said sealing means includes a labyrinthian seal.

10. The mechanism as claimed in claim 9 wherein said sealing means further includes a circular seal.

11. The mechanism as claimed in claim 1 or 2 or 3 or 4 further comprising first, second and third bearing means for rotatably supporting the second housing on the first housing, the third housing on the second housing and the tool support member on the third housing, respectively, and first, second and third sealing means for sealing the first, second and third bearing means, respectively, from the ambient of the envelope.

12. The mechanism as claimed in claim 11 wherein said first, second and third sealing means includes first, second and third labyrinthian seals, respectively.

13. The mechanism as claimed in claim 12 wherein said first, second and third sealing means further include first, second and third lip seals, respectively.

14. The mechanism as claimed in claims 1 or 2 wherein the input drive axis is fixed angularly relative to the first axis at an angle of approximately 90°.

15. The mechanism as claimed in claim 3 or 4 wherein each of the input drive axes is fixed angularly relative to the first axis at an angle of approximately 90°.

16. The mechanism as claimed in claim 1 or 2 or 3 or 4 wherein said second housing is rotatably supported on the second gear means and wherein said second housing is coupled to said first member (162) to rotate therewith about the first axis for providing rotation of the second housing.

* * * * *